United States Patent
Dahlman et al.

(10) Patent No.: US 10,462,780 B2
(45) Date of Patent: Oct. 29, 2019

(54) METHOD AND APPARATUS FOR CONFIGURING SOUNDING SIGNALS IN A WIRELESS COMMUNICATION NETWORK

(71) Applicant: Telefonaktiebolaget LM Ericsson (publ), Stockholm (SE)

(72) Inventors: Erik Dahlman, Stockholm (SE); Ylva Jading, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/371,782

(22) Filed: Apr. 1, 2019

(65) Prior Publication Data

US 2019/0230637 A1    Jul. 25, 2019

Related U.S. Application Data

(63) Continuation of application No. 15/483,171, filed on Apr. 10, 2017, now Pat. No. 10,264,569, which is a continuation of application No. 14/797,268, filed on Jul. 13, 2015, now Pat. No. 9,642,130, which is a continuation of application No. 12/672,357, filed as
(Continued)

(51) Int. Cl.
*H04W 72/04* (2009.01)
*H04W 72/12* (2009.01)
*H04L 5/00* (2006.01)
*H04W 99/00* (2009.01)
*H04W 28/18* (2009.01)
*H04W 88/08* (2009.01)

(52) U.S. Cl.
CPC ........ *H04W 72/042* (2013.01); *H04L 5/0051* (2013.01); *H04W 72/1268* (2013.01); *H04W 99/00* (2013.01); *H04W 28/18* (2013.01); *H04W 88/08* (2013.01)

(58) Field of Classification Search
CPC .......................... H04W 72/04; H04W 72/042
See application file for complete search history.

(56) References Cited

U.S. PATENT DOCUMENTS

| | | |
|---|---|---|
| 5,757,850 A | 5/1998 | Takaki |
| 7,630,733 B2 | 12/2009 | Usuda et al. |
| 8,086,272 B2 | 12/2011 | Teo et al. |

(Continued)

FOREIGN PATENT DOCUMENTS

| | | |
|---|---|---|
| CN | 1981447 A | 6/2007 |
| EP | 2023504 A2 | 2/2009 |
| WO | 2006034577 A1 | 4/2006 |

OTHER PUBLICATIONS

Nokia Siemens Networks et al., "UL Sounding Reference Signal", 3GPP TSG RAN WG1 #49bis, Jun. 25-29, 2007, pp. 1-5, Orlando, US, R1-072988.

*Primary Examiner* — Gary Lafontant
(74) *Attorney, Agent, or Firm* — Coats & Bennett, PLLC

(57) ABSTRACT

The teachings presented herein propose a separation between the configuration of a sounding signal, and the initialization of the sounding signal. In other words, in at least one example embodiment proposed herein, a base station or other controlling entity sends, to a mobile station, an explicit or implicit indication that causes the mobile station to transmit a sounding signal according to sounding signal configuration parameters that at least a portion of which were previously and separately sent to the mobile station.

16 Claims, 5 Drawing Sheets

Related U.S. Application Data application No. PCT/EP2008/057722 on Jun. 18, 2008, now Pat. No. 9,131,534.

(60) Provisional application No. 60/954,736, filed on Aug. 8, 2007.

(56) References Cited

U.S. PATENT DOCUMENTS

| | | |
|---|---|---|
| 8,213,994 B2 | 7/2012 | Cave et al. |
| 9,131,534 B2 | 9/2015 | Dahlman et al. |
| 9,642,130 B2 | 5/2017 | Dahlman et al. |
| 2007/0230373 A1 | 10/2007 | Li et al. |
| 2007/0253379 A1 | 11/2007 | Kumar et al. |
| 2008/0062953 A1 | 3/2008 | Li et al. |
| 2008/0095223 A1 | 4/2008 | Tong et al. |
| 2008/0268857 A1 | 10/2008 | McCoy et al. |
| 2008/0273494 A1 | 11/2008 | Vook et al. |
| 2009/0042615 A1 | 2/2009 | Teo et al. |
| 2012/0243501 A1 | 9/2012 | Vook et al. |

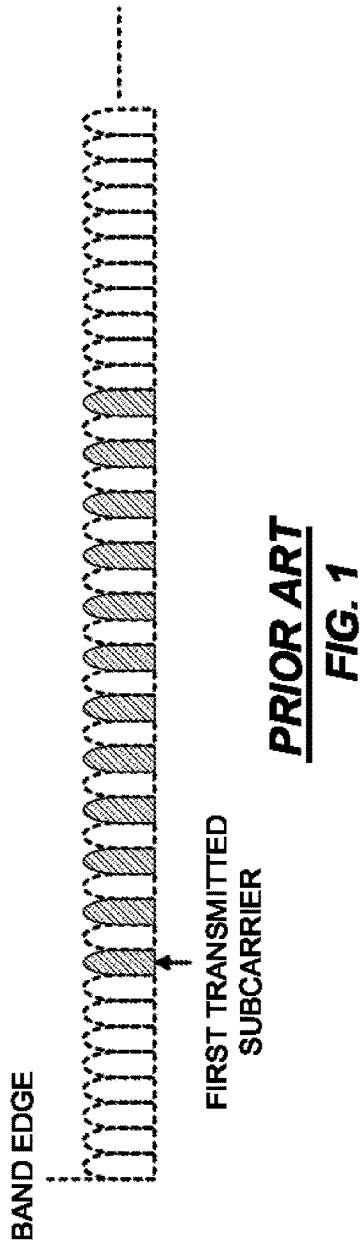
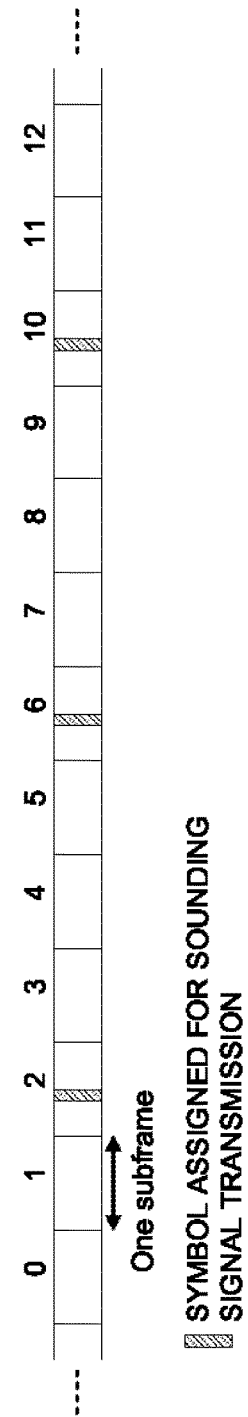

METHOD AND APPARATUS FOR CONFIGURING SOUNDING SIGNALS IN A WIRELESS COMMUNICATION NETWORK

RELATED APPLICATIONS

This application is a continuation of U.S. patent application Ser. No. 15/483,171 filed Apr. 10, 2017, which is a continuation of U.S. patent application Ser. No. 14/797,268, filed Jul. 13, 2015, now U.S. Pat. No. 9,642,130, issued on May 2, 2017, which is a continuation of U.S. patent application Ser. No. 12/672,357, filed Feb. 5, 2010, now U.S. Pat. No. 9,131,534, issued Sep. 8, 2015, which is the National Stage of International Patent Application No. PCT/EP2008/057722, filed Jun. 18, 2008, which claims priority to U.S. Provisional Patent Application No. 60/954,736, filed Aug. 8, 2007, the contents of each of which is hereby incorporated by reference in their entirety.

TECHNICAL FIELD

The present invention generally relates to wireless communication networks, and particularly relates to configuring sounding signal transmissions in such networks.

BACKGROUND

Uplink sounding reference signals ("sounding signals") are known signals transmitted on the uplink (mobile-terminal-to-network) direction. Such sounding signals can be used by the receiver (the base station) to estimate the uplink channel quality, including the uplink channel quality for different frequency bands. The channel-quality estimates can e.g. be used by the uplink scheduler (located in the base station) to determine a suitable uplink data rate (uplink rate control) or select a suitable frequency band for the uplink transmission for a given mobile terminal (so called channel-dependent frequency-domain scheduling).

Uplink sounding signals can also be used by the receiver to estimate the timing of the received signal. Such receive-timing estimates can be used by the network subsequently to adjust the mobile-terminal transmit timing in order to time-align the receive timing of the uplink transmissions of different mobile terminals. Other uses of the uplink sounding signals are also possible.

In Long Term Evolution (LTE), as being developed by the Third Generation Partnership Project (3GPP), the uplink sounding signals can be seen as OFDM signals, implying that they consist of a number of subcarriers with suitable modulation applied to each subcarrier. 3GPP Technical Specifications (TSs) serving as useful references for additional background details include: 3GPP TS 36.211, entitled "Evolved Universal Terrestrial Radio Access (E-UTRA); Physical channels and modulation"; 3GPP TS 36.213, entitled "Evolved Universal Terrestrial Radio Access (E-UTRA); Physical layer procedures"; 3GPP TS 36.321, entitled "Evolved Universal Terrestrial Radio Access (E-UTRA); Medium Access Control (MAC) protocol specification"; and 3GPP TS 36.331, entitled "Evolved Universal Terrestrial Radio Access (E-UTRA); Radio Resource Control (RRC); Protocol specification".

FIG. 1 generally illustrates an OFDM context for sounding signals. As shown, a sounding signal can be characterized in the frequency domain by: the index of the first transmitted subcarrier of the sounding signal (index eight is illustrated); the number of transmitted subcarriers of the sounding signal (twelve are illustrated); the spacing between transmitted subcarriers, also sometimes referred to as the repetition factor (RPF) of the sounding signal (a spacing of two is illustrated).

The LTE uplink time-domain structure is outlined in FIG. 2. Each subframe of length 1 ms consists of two equal-sized slots of length 0.5 ms. Each slot then consists of seven symbols. Within each slot, one symbol is used as a so called (demodulation) reference signal, which is not the same as the sounding (reference) signals introduced above. Indeed, such demodulation reference signals are used for uplink channel estimation to enable coherent uplink detection. The remaining symbols in each slot are typically used for data transmission. Within each subframe there are thus two demodulation reference symbols and twelve "data" symbols.

Accordingly, if sounding signals are to be transmitted on the uplink, a subset of the data symbols, e.g. every M-th data symbol, can be replaced by sounding signals. Typically the sounding signals are not transmitted in every subframe. Instead, one data symbol in every N-th subframe is replaced by a sounding signal (consisting of a number of subcarriers according to FIG. 1). Thus, in the time domain, the sounding signal structure can be characterized as shown in FIG. 3 by: the period (measured in the number of subframes) of the sounding signal, i.e. how often the sounding signal is transmitted (a period of four subframes is shown in FIG. 3); the time offset (measured in number of subframes) of the sounding signal (an offset of two subframes is shown in FIG. 3); the position of the sounding signal within the subframe, i.e., which data symbol has been replaced by a sounding signal (not explicitly illustrated in FIG. 3).

Within the above context, different modulation can be applied to the transmitted subcarriers of the sounding signals. This modulation may differ between different terminals within a cell or different terminals in neighbor cells. As an example, for 3GPP LTE, the modulation of the transmitted subcarriers is assumed to be based on so-called Zadoff-Chu sequences that have been extended to a length equal to the number of transmitted subcarriers. For a terminal to transmit sounding signals, it needs to know the parameters used for the sounding signal transmission including: the frequency domain parameters (bandwidth, number of transmitted subcarriers, spacing between transmitted subcarriers (repetition factor), index of first transmitted subcarrier, etc.); time-domain parameters (period, offset, position within the subframe, etc.); and which modulation symbols to use for the transmitted subcarriers of the sounding reference signal.

Some of these sounding signal configuration parameters may be implicitly given, for example, by the identity of the cell in which a terminal is active. However, several of the parameters are provided (configured) by means of downlink signaling to the terminal. In many cases, sounding signals are only to be transmitted intermittently, e.g., when the mobile terminal is to transmit data on the uplink. In view of this intermittent transmission, a base station could be configured to send sounding signal configuration parameters to a terminal each time the terminal is intended to transmit sounding signals. However, that arrangement imposes potentially high signaling overhead for managing sounding signal transmissions from a plurality of terminals.

SUMMARY

The teachings presented herein propose a separation between the configuration of a sounding signal and the initialization of the sounding signal. In other words, in at least one example embodiment proposed herein, a base station or other controlling entity separates the selection of sounding signal parameters (sounding signal configuration) and the signaling of that configuration information to a mobile terminal from the "ordering" or other initiation of sounding signal transmission. Thus, a mobile station may be sent sounding signal configuration information and subsequently be commanded (implicitly or explicitly) to begin sounding signal transmissions according to the previously provided configuration information.

Accordingly, one or more embodiments presented herein provide a method of controlling the transmission of sounding signals by a mobile station operating in a wireless communication network. The method is characterized by sending configuration parameters for a sounding signal to be transmitted by the mobile station, and subsequently sending a command or other initiating signal to the mobile station separately from said configuration parameters, to cause the mobile station to transmit the sounding signal according to said configuration parameters. In at least one embodiment, the method is further characterized by sending updated configuration parameters on a first time basis, and sending commands or other initiating signals to cause the mobile station to transmit the sounding signal on a second, faster time basis.

Of course, the present invention is not limited to the above contexts, nor is it limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a diagram of conventional sounding signal transmission depicted in a frequency domain, such as might be used in an LTE system.

FIG. 3 is a diagram of conventional sounding signal transmission depicting a time domain, such as used in LTE systems.

DETAILED DESCRIPTION

Figure 2:
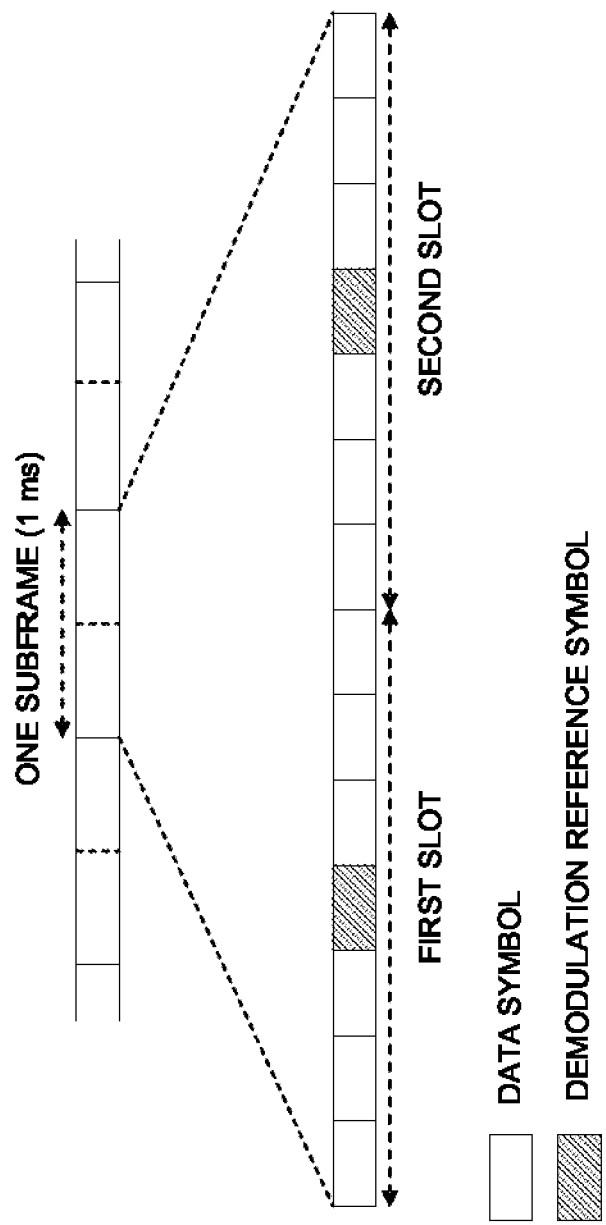
FIG. 2 is a diagram of conventional uplink time-domain structuring, as used in LTE systems.
Figure 4:
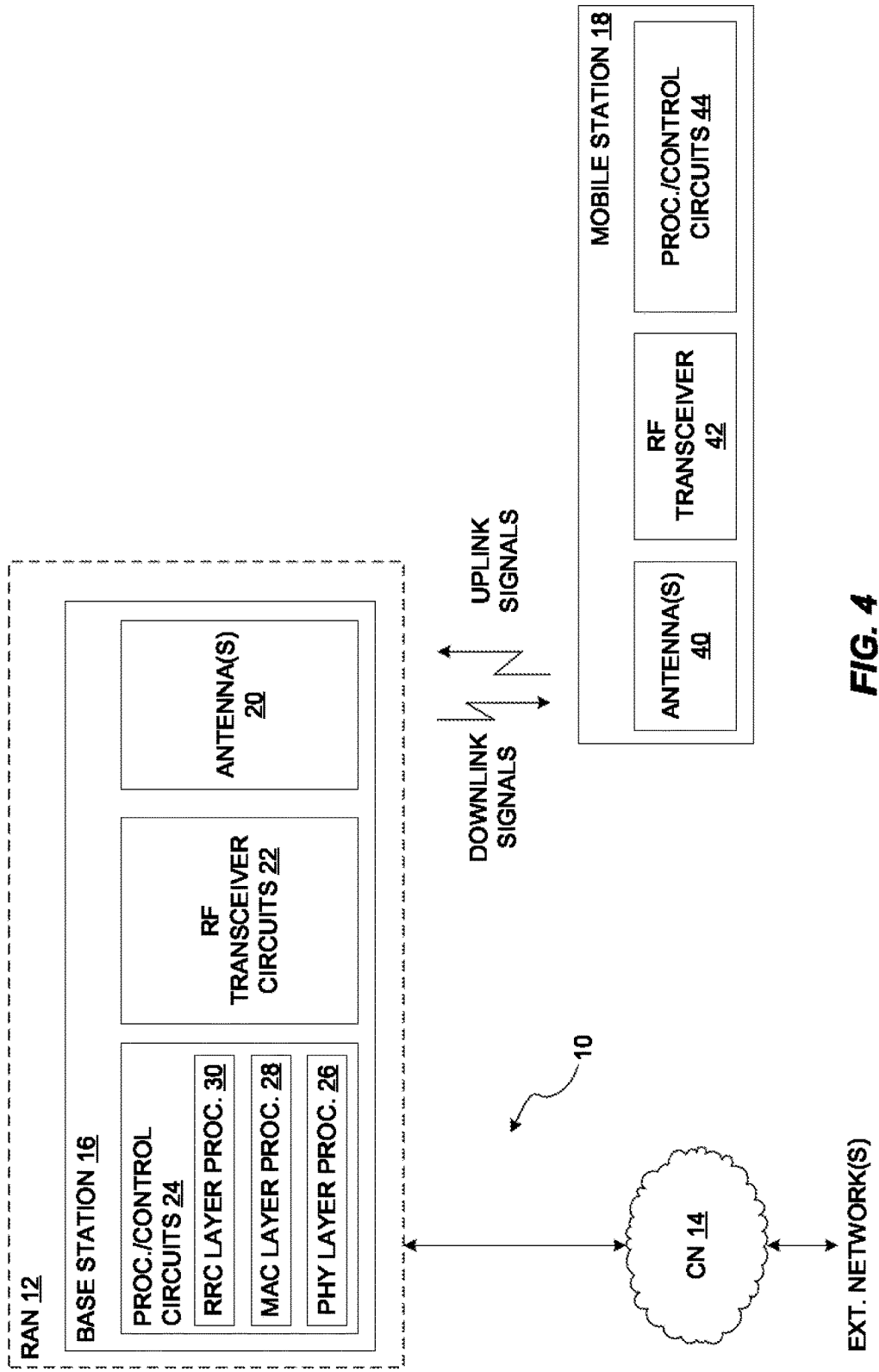
FIG. 4 is a diagram of a wireless communication network, including embodiments of a base station and a mobile station configured according to the sounding signal teachings presented herein.

FIG. 4 illustrates a wireless communication network 10, including a radio access network (RAN) 12, and a core network (CN) 14. The RAN 12 includes one or more base stations 16 (one is illustrated), each supporting wireless communications with one or more mobile stations 18 (one is illustrated). In operation, the base stations 16 communicatively couple the mobile stations 18 to the CN 14, which in turn communicatively couples to one or more external networks, such as the PSTN, the Internet, etc.

As a non-limiting example, the wireless communication network 10 is an LTE network and the base stations 16 correspondingly are Enhanced Node Bs (eNodeBs), and the mobile stations 18 are LTE-compatible handsets or other wireless communication devices. Indeed, it should be understood that the term "mobile station" as used herein broadly encompasses essentially any type of wireless communication device including but not limited to cellular radiotelephones, wireless pagers, PDAs, computers, and network/modem cards or modules.

Turning back to the illustrated details, the example base station 16 includes one or more antennas 20, radio frequency (RF) transceiver circuits 22, and one or more processing/control circuits 24, which include network layer/protocol processors 26, 28, and 30. These processors 26, 28, and 30 respectively provide physical layer, Medium Access Control (MAC) layer, and Radio Resource Control (RRC) layer processing and control. In terms of implementation, such processors comprise hardware, software, or any combination thereof. In at least one embodiment, the base station's processing/control circuits 24 include one or more computer systems, e.g., cards or modules including microprocessor/DSP circuits. One or more memory circuits and/or storage devices included in the base station 16 serve as a computer readable medium or media for storing computer program instructions, including instructions for implementing the sounding signal teachings presented herein.

Similarly, the example mobile station 18 includes one or more antennas 40, an RF transceiver 42, and one or more processing/control circuits 44. As with the base station 16, these processing/control circuits 44 may be implemented via digital processing circuits, such as one or more microprocessors, DSPs, etc. In at least one embodiment, the processing/control circuits 44 include a baseband processor for processing incoming downlink communication signals after downconversion and digitization via the RF transceiver 42, and for generating outgoing uplink communication signals for transmission via the RF transceiver 42 and antenna(s) 40. The processing/control circuits 44 also include a system controller in one or more embodiments, which may be implemented with the baseband processor or separately from it. The system controller provides overall device control, such as user interface management, etc.

It should be understood that the illustrated base station and mobile station implementations represent non-limiting examples, in as much as other functional circuit arrangements may be used to implement the sounding signal functionality described herein. Regarding that functionality, the base station 16 is, in one or more embodiments, configured to control the transmission of sounding signals by the mobile station 18. Accordingly, the base station 16 is characterized by one or more processing circuits—e.g., the processing/control circuits 24—that are configured to send configuration parameters for a sounding signal to be transmitted by the mobile station 18, and subsequently send a command or other initiating signal to the mobile station 18 separately from said configuration parameters, to cause the mobile station 18 to transmit the sounding signal according to said configuration parameters.

In at least one embodiment, the base station 16 is further characterized in that the one or more processing circuits are configured to send updated configuration parameters on a first time basis, and send commands or other initiating signals to cause the mobile station 18 to transmit the sounding signal on a second, faster time basis. Additionally, in at least one embodiment, the base station 16 is further characterized in that the one or more processing circuits are configured to use Radio Resource Control (RRC) signaling to send the configuration parameters. Still further, in at least one embodiment, the one or more processing circuits are configured to use MAC signaling to send the commands or other initiating signals. As such, sounding signal configuration for the mobile station 18 may be carried out by the base station 16 via RRC layer signaling, and subsequent (or repeated) initiation of sounding signal transmission by the mobile station 18 can be carried out by the base station 16 via MAC layer signaling.

As a further point of characterization, in at least one embodiment, the base station's one or more processing circuits are configured to send one or more additional configuration parameters in conjunction with sending the commands or other initiating signals. In this manner, the mobile station 18 transmits the sounding signal based on earlier-received configuration parameters, as modified by or updated by the one or more additional configuration parameters. Such operation for example allows the base station 16 to send basic or nominal sounding signal configurations as desired for the mobile station 18 using slower or less frequent signaling, while still allowing for the base station 16 to update or adjust those configurations as needed at the initiation of sounding signal transmission.

Regarding such initiation, it is contemplated herein that explicit or implicit initiation may be used by the base station 16, and recognized by the mobile station 18. In at least one embodiment, the base station 16 is further characterized in that its one or more processing circuits are configured to subsequently send the command or other initiating signal (for initiating sounding signal transmission) to the mobile station 18 implicitly, by sending an uplink scheduling grant to the mobile station 18. Of course, the mobile station 18 is, in such embodiments, appropriately configured to recognize this form of implicit initiation. Additionally, or alternatively, the base station's one or more processing circuits are configured to subsequently send the command or other initiating signal to the mobile station 18 explicitly, by sending a sounding signal initiation command via downlink signaling. (The command may, for example, be sent via MAC layer signaling.)

Figure 5:
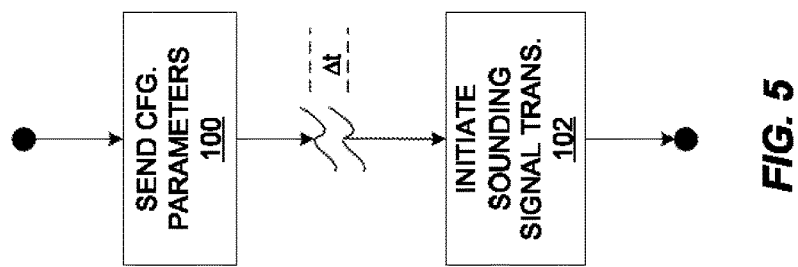
FIG. 5 is a logic flow diagram illustrating one embodiment of a method of separating sounding signal configuration from sounding signal transmission initiation.

FIG. 5 broadly illustrates the above base station method. It should be understood that this logic flow diagram may represent one aspect of a potentially much more complicated processing flow implemented at the base station 16. As such, the illustrated processing may be looped or otherwise repeated as needed, for any number of mobile stations 18. Also, the illustrated processing may be included as part of other processing routines, and the illustration therefore should be understood as a potentially simplified processing flow intended to highlight sounding signal processing of particular interest herein.

With these qualifications in mind, one sees that the base station 16 sends configuration parameters for a sounding signal to be transmitted by the mobile station 18 (Block 100), and subsequently sends a command or other initiating signal to the mobile station 18 separately from the configuration parameters (Block 102), to cause the mobile station 18 to transmit the sounding signal according to the configuration parameters. "Subsequently" in this context denotes some time after, but should not be construed as requiring some minimum separation in time between configuring sounding signal transmission and commanding sounding signal transmission. Rather, it should be understood that the use of "subsequently" denotes or otherwise emphasizes the advantageous separation of sounding signal configuration from the actual commanding of sounding signal transmission. Such separation yields significant flexibility and can reduce signaling overhead.

Figure 6:
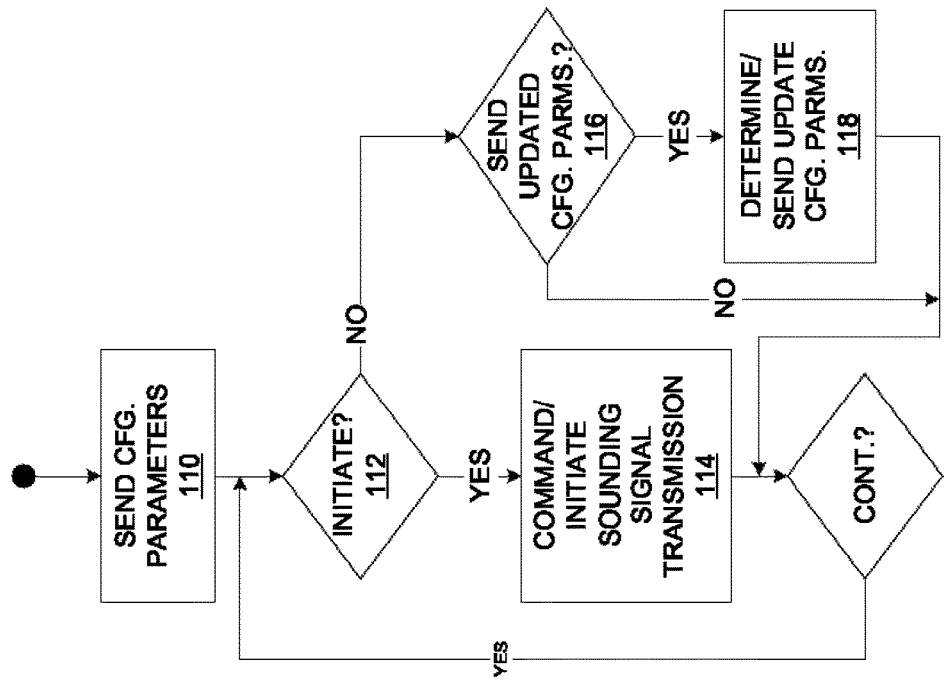
FIG. 6 is a logic flow diagram illustrating example details for the logic flow diagram of FIG. 5.

For example, as noted, the base station 16 is, in one or more embodiments, configured to send updated (sounding signal) configuration parameters on a first time basis, and send commands or other initiating signals to cause the mobile station 18 to transmit the sounding signal on a second, faster time basis. FIG. 6 presents an example flow diagram for carrying out such a method. Again, FIG. 6 may or may not represent stand-alone processing, and it should be understood that the base station 16 may implement the logical processing of FIG. 6 for multiple mobile stations 18, and may integrate such processing into other functional operations.

The illustrated processing "begins" with the base station 16 sending (sounding signal) configuration parameters to the mobile station 18 (Block 110), and then determining whether to initiate sounding signal transmission by the mobile station 18 (Block 112). For example, the base station 16 may run a software or hardware timer, upon expiration of which it initiates sounding signal transmission by the mobile station 18. Additionally, or alternatively, the base station 16 may determine whether sounding signal transmission should be initiated on an as-needed basis, such as where radio link adaptation changes require, or where channel condition changes are detected.

If sounding signal transmission is desired (either timewise or based on changes in conditions), the base station 16 commands sounding signal transmission by the mobile station 18 (Block 114). From there, processing generally continues in looped fashion, although such looping may be ended or overridden as needed or appropriate. If sounding signal transmission is not desired, processing continues from Block 112 by determining whether to send updated configuration parameters (Block 116). Again, sounding signal configuration updating may be done on a timed or as needed basis, and may be done more slowly than sounding signal transmission is initiated. If it is desired to update the mobile station's sounding signal configuration, the base station 16 determines the appropriate updated parameters and sends them to the mobile station 18 (Block 118), such as via RRC signaling.

Note, however, that it is contemplated in at least some embodiments herein to send "tweaked" or select additional parameters as part of commanding sounding signal transmission. Thus, it should be understood that select sounding signal configuration parameter information can be sent as part of the initiation shown in Block 114 (such as via MAC layer signaling), and that such additional or updated parameter transmission can be done at every such initiation, for some initiations, or not at all. In any case, the baseline set of sounding signal parameters, which in one or more embodiments comprises a more comprehensive or "full" set of sounding signal configuration parameters, can be sent more slowly or as needed, via the separate processing of Block 116.

In a complementary manner, the mobile station 18 is configured for operation in the wireless communication network 10. More particularly, the mobile station 18 is characterized by one or more processing circuits configured to receive configuration parameters for a sounding signal to be transmitted by the mobile station 18, and subsequently transmit a sounding signal in accordance with the configuration parameters, in response to receiving a separate command or other initiating signal. Thus, the mobile station 18 may be understood as being advantageously configured to allow its sounding signal transmission to be configured separately from sounding signal transmission initiation.

For example, the mobile station 18 is configured to receive one or more RRC layer sounding signal parameter configuration messages from the base station 16, and to configure its sounding signal transmission parameters accordingly, and to initiate actual sounding signal transmissions as subsequently commanded, according to those previously received configuration parameters. Further, as noted in the context of Block 114 in FIG. 6, the mobile station 18 may be further characterized in that it transmits its sounding signal additionally in accordance with any additional configuration parameters received with the subsequent command or other initiating signal. In at least one embodiment, the subsequent commands are explicit command messages, such as may be sent to the mobile station 18 via MAC layer signaling. Additionally or alternatively, the subsequent commands are implicit. For example, in at least one embodiment, the mobile station 18 is configured to interpret at least some uplink scheduling grants from the base station 16 as implicit commands to transmit a sounding signal.

Broadly, it should be understood that once the sounding signal configuration has been carried out by the base station 16, the start of actual sounding signal transmission by the mobile station 18 can be ordered by more rapid signaling. This may be done by means of MAC signaling, as noted (where such signaling is carried out between the MAC protocol entities of the base station 16 and the mobile station 18). Such MAC signaling can be done in different ways, e.g., by inserting the signaling within a MAC Protocol Data Unit (PDU) or using a so called Layer 1/Layer 2 (L1/L2) control channel. Regardless, once the sounding signal transmission has been initiated, it can also be stopped with a similar kind of MAC signaling.

Figure 7:
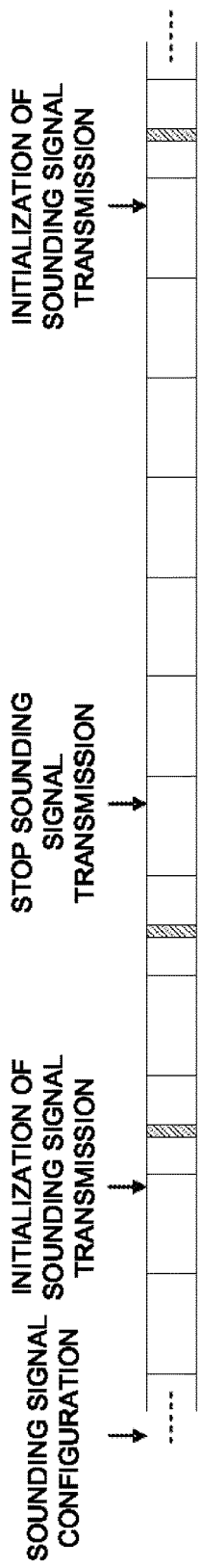
FIG. 7 is a diagram of sounding signal configuration, initiation, and termination (stopping) according to one embodiment of the teachings herein, as depicted in the time domain.

Such operation is illustrated in the example of FIG. 7, where a period of two transmission subframes is configured for the sounding signal. To avoid a never-ending sounding signal transmission scenario in a case where the mobile station 18 does not correctly detect signaling to stop sounding signal transmission, the mobile station 18 may also, in addition to the configuration parameters discussed above, use a "duration" parameter specifying for how long, e.g. measured in number of subframes, its sounding signal transmissions should continue after the base station 16 has initiated sounding signal transmission.

A special case is the configuration of a duration time of one, implying that only a single sounding signal transmission (one subframe) takes place. Thus, by configuring the duration parameter to one subframe, the mobile station 18 is configured to perform "one-shot" sounding signal transmission, which may be advantageous for some operating scenarios, such as where the base station 16 uses brief but frequently repeated one-shot sounding signal transmissions to maintain updated channel estimates, etc., for the mobile station 18.

Further, as previously noted, in an alternative to an explicit initiation signaling, the mobile station 18 may be configured to start sounding signal transmission responsive to receiving an uplink scheduling grant, i.e., in response to receiving permission from the network 10 to conduct an uplink data transmission. In such a case, as an alternative to explicit "stopping" of the sounding signal transmission, the mobile station 18 continues its sounding signal transmission for a certain duration after the last scheduling grant has been received, in accordance with its duration configuration parameter (which may be held as a default value at the mobile station 18, and/or which may be provided or updated by the base station 16).

Broadly, the teachings presented herein provide an advantageous method and apparatus for separating the selection and sending of sounding signal configuration parameters to a mobile station, from the "ordering" of the mobile station to initiate transmission of its sounding signal (also referred to as a sounding reference signal). That is, one or more embodiments contemplated herein provide a low-overhead method for configuring and initiating sounding signals, based on separating the configuration (setting of the parameters) of sounding signals from the actual initiation of the sounding signal transmission.

In at least one embodiment, the configuration is done less often than the initiation. Additionally or alternatively, the configuration is done by RRC signaling. In the same or other embodiments, the initiation is done by MAC signaling. In the same or other embodiments, sounding signal transmissions may be stopped by "stop" signaling. In the same or other embodiments, a duration parameter can be included in the configuration parameters used for configuring sounding signal transmissions by a mobile station. In the same or other embodiments, initiation of sounding signal transmission is implicitly given by the reception of a scheduling grant from the network. In the same or other embodiments, the sounding signal transmission continues for a certain time duration after the reception of a scheduling grant.

With these and other examples in mind, those skilled in the art will appreciate that the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

The invention claimed is:

1. A method of controlling the transmission of sounding signals by a mobile station operating in a wireless communication network the method comprising:
    sending configuration parameters for a sounding signal to be transmitted by the mobile station; and
    subsequently sending a command or other initiating signal to the mobile station separately from said configuration parameters, to cause the mobile station to transmit the sounding signal according to said configuration parameters.

2. The method of claim 1, further comprising sending updated configuration parameters on a first time basis, and sending commands or other initiating signals to cause the mobile station to transmit the sounding signal on a second, faster time basis.

3. The method of claim 1, further comprising using Radio Resource Control (RRC) signaling to send said configuration parameters.

4. The method of claim 3, further comprising using Medium Access Control (MAC) signaling to send the commands or other initiating signals.

5. The method of claim 4, further comprising sending one or more additional configuration parameters in conjunction with sending the commands or other initiating signals, such that the mobile station transmits the sounding signal based on earlier-received said configuration parameters, as modified by or updated by the one or more additional configuration parameters.

6. The method of claim 1, wherein subsequently sending the command or other initiating signal to the mobile station comprises implicitly commanding the mobile station to initiate sounding signal transmission by sending an uplink scheduling grant to the mobile station.

7. The method of claim 1, wherein subsequently sending the command or other initiating signal to the mobile station comprises explicitly commanding the mobile station to initiate sounding signal transmission by sending a sounding signal initiation command via downlink signaling.

8. A base station configured to control the transmission of sounding signals by a mobile station, said base station comprising one or more processing circuits configured to:
   send configuration parameters for a sounding signal to be transmitted by the mobile station; and
   subsequently send a command or other initiating signal to the mobile station separately from said configuration parameters, to cause the mobile station to transmit the sounding signal according to said configuration parameters.

9. The base station of claim 8, wherein the one or more processing circuits are further configured to send updated configuration parameters on a first time basis, and send commands or other initiating signals to cause the mobile station to transmit the sounding signal on a second, faster time basis.

10. The base station of claim 8, wherein the one or more processing circuits are further configured to use Radio Resource Control (RRC) signaling to send said configuration parameters.

11. The base station of claim 10, wherein the one or more processing circuits are further configured to use Medium Access Control (MAC) signaling to send the commands or other initiating signals.

12. The base station of claim 11, wherein the one or more processing circuits are further configured to send one or more additional configuration parameters in conjunction with sending the commands or other initiating signals, such that the mobile station transmits the sounding signal based on earlier-received said configuration parameters, as modified by or updated by the one or more additional configuration parameters.

13. The base station of claim 8, wherein the one or more processing circuits are further configured to subsequently send the command or other initiating signal to the mobile station implicitly by sending an uplink scheduling grant to the mobile station.

14. The base station of claim 8, wherein the one or more processing circuits are further configured to subsequently send the command or other initiating signal to the mobile station comprises explicitly sending a sounding signal initiation command via downlink signaling.

15. A mobile station configured for operation in a wireless communication network and comprising one or more processing circuits configured to:
   receive configuration parameters for a sounding signal to be transmitted by the mobile station; and
   subsequently transmit a sounding signal in accordance with the configuration parameters, in response to receiving a separate command or other initiating signal.

16. The mobile station of claim 15, wherein the one or more processing circuits are further configured to transmit the sounding signal additionally in accordance with any additional configuration parameters received with the separate command or other initiating signal.

* * * * *